(12) United States Patent
Hecht et al.

(10) Patent No.: US 10,569,346 B2
(45) Date of Patent: Feb. 25, 2020

(54) CUTTING HEAD AND ROTARY CUTTING TOOL HAVING SAME RELEASABLY CLAMPED TO A SHANK VIA A LOCATING PIN

(71) Applicant: Iscar, Ltd., Tefen (IL)

(72) Inventors: Gil Hecht, Nahariya (IL); David Ben Harouche, Nahariya (IL)

(73) Assignee: Iscar, Ltd., Tefen (IL)

( * ) Notice: Subject to any disclaimer, the term of this patent is extended or adjusted under 35 U.S.C. 154(b) by 163 days.

(21) Appl. No.: 15/801,619

(22) Filed: Nov. 2, 2017

(65) Prior Publication Data

US 2019/0126361 A1    May 2, 2019

(51) Int. Cl.
| | | |
|---|---|---|
| *B23B 31/107* | (2006.01) | |
| *B23B 51/06* | (2006.01) | |
| *B23B 51/04* | (2006.01) | |

(52) U.S. Cl.
CPC ........ *B23B 51/048* (2013.01); *B23B 31/1076* (2013.01); *B23B 51/06* (2013.01); *B23B 2250/12* (2013.01); *B23B 2251/02* (2013.01); *Y10T 408/455* (2015.01); *Y10T 408/90993* (2015.01)

(58) Field of Classification Search
CPC . B23B 31/1076; B23B 51/02; B23B 51/0473; B23B 51/048; B23B 51/06; Y10T 408/90993; Y10T 408/455
See application file for complete search history.

(56) References Cited

U.S. PATENT DOCUMENTS

| | | | |
|---|---|---|---|
| 2,259,611 A | 10/1941 | Burger | |
| 6,012,881 A | 1/2000 | Scheer | |
| 6,109,841 A | 8/2000 | Johne | |
| 6,299,180 B1 | 10/2001 | Satran et al. | |
| 7,556,458 B2 | 7/2009 | Heilmann et al. | |
| 8,376,669 B2 * | 2/2013 | Jaeger | B23B 31/11 408/231 |
| 8,696,270 B2 * | 4/2014 | Shitrit | B23B 31/005 408/231 |
| 9,079,255 B2 | 7/2015 | Jager et al. | |

(Continued)

FOREIGN PATENT DOCUMENTS

| | | |
|---|---|---|
| DE | 102010044273 | 3/2012 |
| KR | 20100113834 | 10/2010 |

OTHER PUBLICATIONS

International Search Report dated Feb. 27, 2019, issued in PCT counterpart application (No. PCT/IL2018/051095).

(Continued)

*Primary Examiner* — Eric A. Gates
(74) *Attorney, Agent, or Firm* — Womble Bond Dickinson (US) LLP

(57) ABSTRACT

A rotary cutting tool includes a cutting head and a tool shank, each having an axial abutment surface and a plurality of drive surfaces. One of the two includes a locating pin, while the other includes a pin receptacle and at least one clamping through bore that opens out to the pin receptacle. The locating pin is received into the pin receptacle. The cutting head and tool shank are releasably clamped together by at least one clamping member that passes through the at least one clamping through bore and acts on the locating pin so that the drive surfaces and the axial abutment surfaces on each part abut each other.

42 Claims, 6 Drawing Sheets

(56) References Cited

U.S. PATENT DOCUMENTS

| | | | |
|---|---|---|---|
| 9,468,979 B2* | 10/2016 | Hecht | ............ B23B 51/00 |
| 9,498,829 B2 | 11/2016 | Zabrosky | |
| 2006/0051172 A1 | 3/2006 | Johnson et al. | |
| 2008/0279645 A1 | 11/2008 | Bae | |
| 2009/0311060 A1 | 12/2009 | Frejd | |
| 2012/0014760 A1 | 1/2012 | Glimpel et al. | |
| 2014/0301799 A1* | 10/2014 | Schwaegerl | ............ B23B 51/02 |
| | | | 408/231 |
| 2017/0028480 A1* | 2/2017 | Schwagerl | ............ B23B 51/02 |
| 2019/0054548 A1* | 2/2019 | Wacinski | ............ B23B 51/02 |

OTHER PUBLICATIONS

Written Opinion dated Feb. 27, 2019, issued in PCT counterpart application (No. PCT/IL2018/051095).

* cited by examiner

CUTTING HEAD AND ROTARY CUTTING TOOL HAVING SAME RELEASABLY CLAMPED TO A SHANK VIA A LOCATING PIN

FIELD OF THE INVENTION

The subject matter of the present application relates to rotary cutting tools having two releasably clamped parts, namely a cutting head, having at least one cutting insert releasably attached thereto, and a tool shank, in particular to where one of the parts has a locating pin, and further in particular to where the two parts are releasably clamped together by a clamping member acting on the locating pin.

BACKGROUND OF THE INVENTION

Rotary cutting tools can be provided with a coupling mechanism for securely attaching a cutting head, having at least one cutting insert releasably attached thereto, to a tool shank. The rotary cutting tool can further be provided with a locating mechanism, that positions the cutting head in a precise predetermined position relative to the tool shank. Typically, such a locating mechanism includes a locating pin that can be received into a pin receptacle. Moreover, in order to transfer torque from the tool shank to the cutting head, the rotary cutting tool can include a driving mechanism. Typically, such a drive mechanism includes driven surfaces located on the cutting head that have a torque force transferred to them, via driving surfaces located on the tool shank.

In some such rotary cutting tools, the driven surfaces are located on transverse ribs and the driving surfaces are separated from one another by a central gap. An example of such a rotary cutting tool is disclosed in, for example, U.S. Pat. No. 7,556,458.

In other such rotary cutting tools the surfaces that translate the rotational force from the body to drill head are faces of dovetail grooves on the body and faces of dovetail protrusions on the drill head. An example of such a rotary cutting tool is disclosed in, for example, U.S. Pat. No. 9,498,829.

U.S. Pat. No. 6,012,881 discloses a drilling tool having an exchangeable tip that has a rotary driver which meshes with a complementary centering and driving part of the base body.

U.S. Pat. No. 9,079,255 discloses a boring tool having a driver connection that has at least two coupling pairs which are separate from one another. Each coupling pair is formed by interlocking coupling elements, namely a receptacle pocket and a driver pin.

SUMMARY OF THE INVENTION

In accordance with a first aspect of the subject matter of the present application there is provided a rotary cutting tool, having a tool central axis that defines opposite forward and rearward directions and about which the rotary cutting tool is rotable in a rotational direction, the rotary cutting tool including:
  a cutting head comprising:
    a head peripheral surface extending circumferentially about the tool central axis and forming a boundary of a rearwardly facing first head end surface;
    a head axial abutment surface located on the first head end surface;
    a plurality of head driven surfaces circumferentially spaced apart from each other and radially inwardly spaced apart from the head peripheral surface, the head driven surfaces facing generally in a first circumferential direction which is opposite to the rotational direction; and
    at least one cutting insert releasably attached to the cutting head;
  a tool shank comprising:
    a shank peripheral surface extending circumferentially about the tool central axis and forming a boundary of a forwardly facing first shank end surface;
    a shank axial abutment surface located on the first shank end surface; and
    a plurality of shank driving surfaces circumferentially spaced apart from each other and radially inwardly spaced apart from the shank peripheral surface, the shank driving surfaces facing generally in a second circumferential direction which is opposite the first circumferential direction;
  a locating pin projecting from one of the first head end surface and the first shank end surface, the locating pin having at least one peripherally disposed clamping recess;
  a pin receptacle recessed in the other of the first head end surface and the first shank end surface; and
  at least one clamping through bore formed in whichever one of the head peripheral surface and the shank peripheral surface the pin receptacle is recessed, so that the clamping through bore opens out to the pin receptacle, wherein:
    the rotary cutting tool is adjustable between a released position and a locked position, and in the locked position:
      the locating pin is received into the pin receptacle; and
      at least one clamping member passes through the at least one clamping through bore and acts on the at least one clamping recess of the locating pin, so that:
        each shank driving surface abuts a corresponding one of the head driven surfaces;
        the head axial abutment surface abuts the shank axial abutment surface; and
      the cutting head and tool shank are releasably clamped together.

In accordance with a second aspect of the subject matter of the present application there is provided a cutting head, having a head central axis that defines opposite forward and rearward directions, the cutting head comprising:
  a head peripheral surface extending circumferentially about the head central axis and forming a boundary of a rearwardly facing first head end surface;
  a head axial abutment surface located on the head end surface;
  a plurality of head driven surfaces circumferentially spaced apart from each other and radially inwardly spaced apart from the head peripheral surface, the head driven surfaces facing generally in a first circumferential direction which is opposite to the rotational direction;
  at least one cutting insert releasably attached to the cutting head; and either:
    a locating pin projecting from the first head end surface, the locating pin having at least one peripherally disposed clamping recess; or
  a pin receptacle recessed in the first head end surface and at least one clamping through bore formed in the head peripheral surface and opening out to the pin receptacle.

It is understood that the above-said is a summary, and that features described hereinafter may be applicable in any combination to the subject matter of the present application, for example, any of the following features may be applicable to the cutting head or the rotary cutting tool:

The locating pin can project from the first head end surface. The pin receptacle can be recessed in the first shank end surface. The at least one clamping through bore can be formed in the shank peripheral surface.

The head axial abutment surface can be disposed axially between the plurality of head driven surfaces and the locating pin, respectively. The shank axial abutment surface can be disposed axially between the plurality of shank driving surfaces and the pin receptacle, respectively.

The first head end surface can comprise a plurality of female members recessed therein, the plurality of female members being circumferentially spaced apart from each other and radially inwardly spaced apart from the head peripheral surface by a narrow head strip portion of the first head end surface. Each head driven surface can be located in a respective one of the plurality of female members. The first shank end surface can comprise a plurality of male members projecting therefrom, the plurality of male members being circumferentially spaced apart from each other and radially inwardly spaced apart from the shank peripheral surface by a narrow shank strip portion of the first shank end surface. Each shank driving surface can be located on a respective one of the plurality of male members.

The cutting head can comprise a head coolant channel that opens out at a respective female member. The tool shank can comprise a shank coolant channel that opens out at least partially at a respective male member. The head coolant channel and shank coolant channel can be in fluid communication with each other.

The head coolant channel and shank coolant channel can be in fluid communication with each other via a coolant reservoir defined by a gap formed between the female and male members.

The female and male members may not be in radial abutment with each other, in the locked position.

The first head end surface can comprise exactly two female members arranged diametrically opposite each other. The first shank end surface can comprise exactly two male members arranged diametrically opposite each other.

Each female member can have a non-circular radial cross-section. Each male member can have a non-circular radial cross-section.

Each female member can open out to the first head end surface at a female member opening surface which can be completely bounded by the head axial abutment surface.

Each female member can comprise a female member inner peripheral surface extending circumferentially about a female member axis and forming a boundary of a female member bottom surface. The cutting head can comprise a head coolant channel that opens out at the female member bottom surface.

The head peripheral surface can comprise a plurality of head flutes that extend helically about the tool central axis to the first head end surface, forming a plurality of cutting arms, each cutting arm being formed between two adjacent head flutes and comprising rotationally opposite cutting leading and trailing surfaces. Each female member can be located at a cutting arm. The female member inner peripheral surface can comprise rotationally opposite female member side surfaces and radially opposite female member inner and outer surfaces connecting the female member side surfaces. At any radial distance from the tool central axis through the male members, the distance between the rotationally leading female member side surface and the cutting leading surface of the cutting arm at which it is located can define a leading distance and the distance between the rotationally trailing female member side surface and the cutting trailing surface of the cutting arm at which it is located can define a trailing distance, both distances are measured in a circumferential direction. The leading distance can be greater than the trailing distance.

Each male member can be integrally formed with the tool shank to have unitary one-piece construction therewith.

Each male member can project from the first shank end surface at a male member base surface which can be completely bounded by the shank axial abutment surface.

Each male member can comprise a male member outer peripheral surface extending circumferentially about a male member axis and forming a boundary of a male member top surface, the male member outer peripheral surface can comprise rotationally opposite male member side surfaces and radially opposite male member inner and outer surfaces connecting the male member side surfaces. The tool shank can comprise a shank coolant channel that opens out at the rotationally trailing male member side surface, the male member top surface and the first shank end surface.

The head peripheral surface can comprise a plurality of head flutes that can extend helically about the tool central axis to the first head end surface.

The locating pin can project from the first head end surface. The plurality of head flutes may not continue onto the locating pin.

The shank peripheral surface can comprise a plurality of shank flutes that can extend helically about the tool central axis to the first shank end surface. In the locked position, each head flute can be aligned with a respective one of the plurality of shank flutes.

The rotary cutting tool can comprise a single centrally disposed locating pin and a single centrally disposed pin receptacle.

The head and shank axial abutment surfaces can extend to the head and shank peripheral surfaces, respectively.

The head and shank axial abutment surfaces can be planar, and can extend perpendicularly to the tool central axis.

Each head driven surface and each shank driving surface can planar, and can extend parallel to the tool central axis.

The rotary cutting tool can comprise exactly two clamping members and exactly two clamping through bores. The locating pin can comprise exactly two clamping recesses.

Each clamping recess can comprise a clamping recess inner peripheral surface that can have a generally frusto-conical shape.

Each clamping member can be rigidly formed.

Each clamping through bore can comprise an internal threaded portion. Each clamping member can comprise an external threaded portion. In the locked position, the external threaded portion can be threadingly engaged with the internal threaded portion.

Each clamping member can comprise a clamping portion that can act on a respective one of the at least one clamping recesses, the clamping portion preferably having a frusto-conical shape.

The cutting head and the tool shank can have the same hardness.

The locating pin can project from the first shank end surface. The pin receptacle can be recessed in the first head end surface. The at least one clamping through bore can be formed in the head peripheral surface.

BRIEF DESCRIPTION OF THE FIGURES

For a better understanding of the present application and to show how the same may be carried out in practice, reference will now be made to the accompanying drawings, in which.

Figure 1:
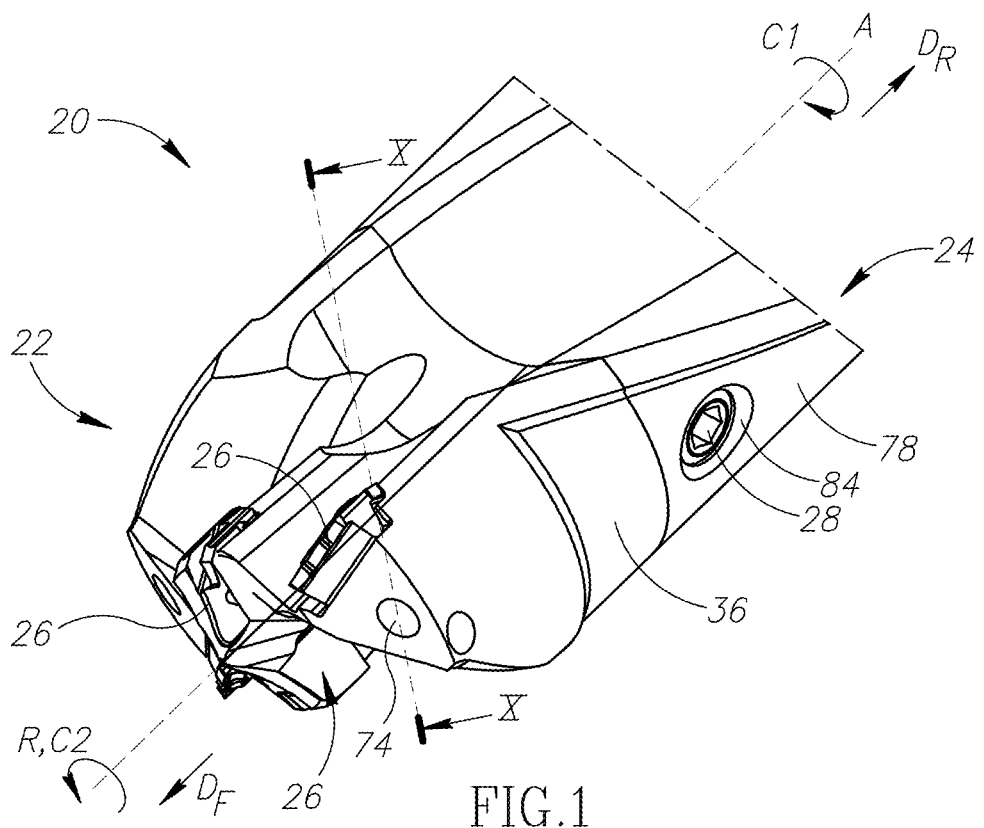
FIG. 1 is a perspective view of a rotary cutting tool in accordance with a first embodiment of the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
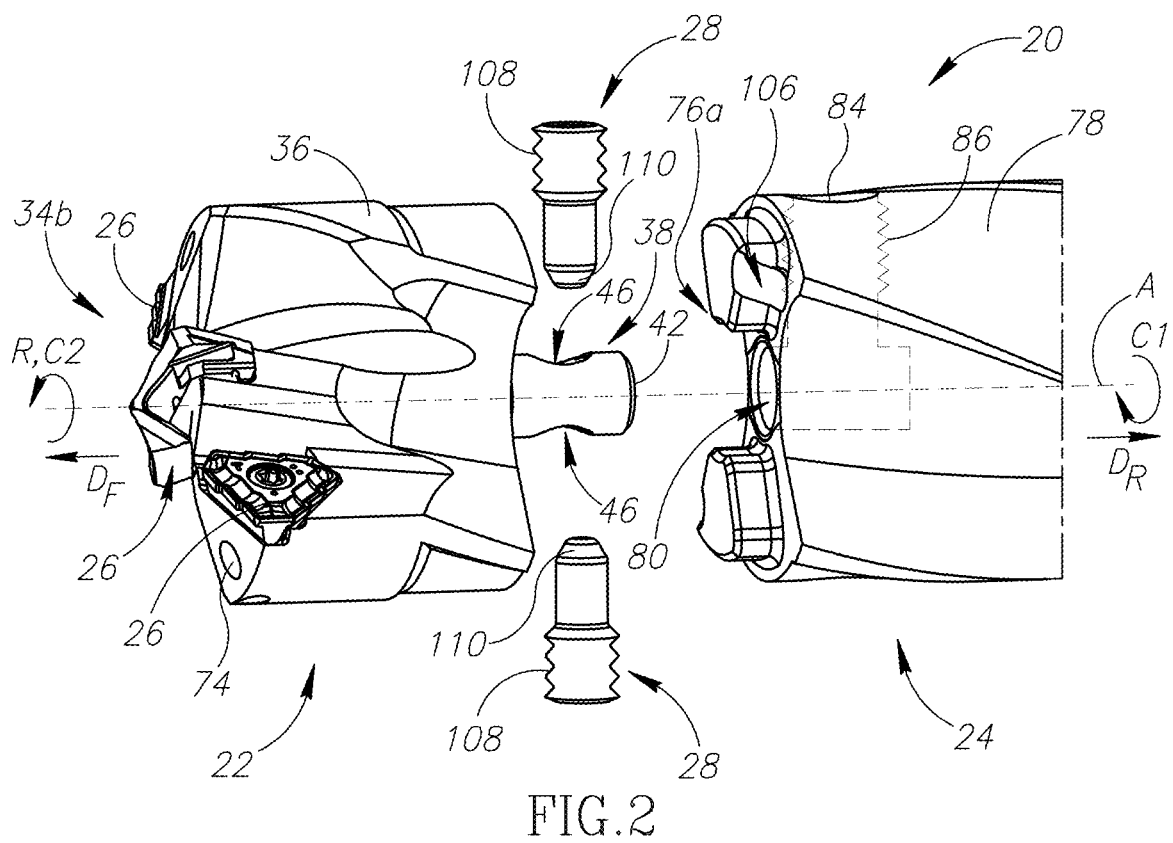
FIG. 2 is an exploded perspective view of the rotary cutting tool shown in FIG. 1.

Attention is first drawn to FIGS. 1 and 2 showing a rotary cutting tool 20, 120 of the type used for drilling operations, in accordance with embodiments of the subject matter of the present application. In this non-limiting example shown in the drawings, the rotary cutting tool 20, 120 is a drilling tool for drilling holes. The rotary cutting tool 20, 120 has a tool central axis A that defines opposite forward and rearward directions $D_F$, $D_R$. The rotary cutting tool 20, 120 is rotatable about the tool central axis A in a rotational direction R. The rotary cutting tool 20, 120 can exhibit rotational symmetry about the tool central axis A. In this non-limiting example shown in the drawings, the rotary cutting tool 20, 120 exhibits 180° rotational symmetry about the tool central axis A.

It should be appreciated that use of the terms "forward" and "rearward" throughout the description and claims refer to a relative position in a direction of the tool central axis A towards the left and right, respectively, in FIGS. 2, 8, 10 and 11.

The rotary cutting tool 20, 120 includes two parts, namely, a cutting head 22, 122 and a complementary tool shank 24, 124 releasably clampable thereto. Both said parts can typically be made from the same material, e.g. steel. Thus, both parts can have the same hardness. At least one cutting insert 26 is releasably attached to the cutting head 22, 122 in an insert pocket 27 located on the tool shank 24, 124. The rotary cutting tool 20, 120 is thus modular. In this non-limiting example shown in the drawings, the rotary cutting tool 20, 120 includes three cutting inserts 26 where one of the cutting insert 26 is centrally disposed and the other cutting inserts 26 are peripherally disposed. However, the rotary cutting tool 20, 120 can have a single cutting insert having a single, continuous cutting edge that extends over the full diametric extent of the rotary cutting tool 20, 120. Each cutting insert 26 can be typically made from cemented carbide and is attached in the pocket 27 that is located at a forward end of the cutting head 22, 122. The rotary cutting tool 20, 120 is adjustable between a released and locked position. In the locked position of the rotary cutting tool 20, 120, the cutting head 22, 122 is releasably clamped to the tool shank 24, 124, by at least one clamping member 28.

Figure 3:
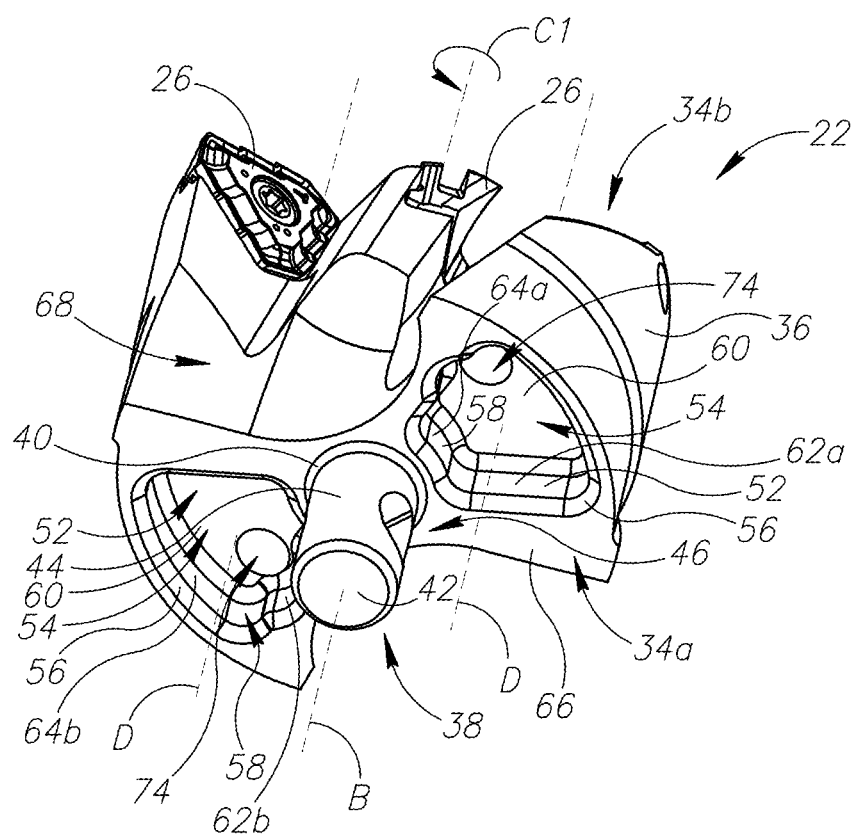
FIG. 3 is a first perspective view of a cutting head shown in FIGS. 1 and 2, showing two female members.
Figure 4:
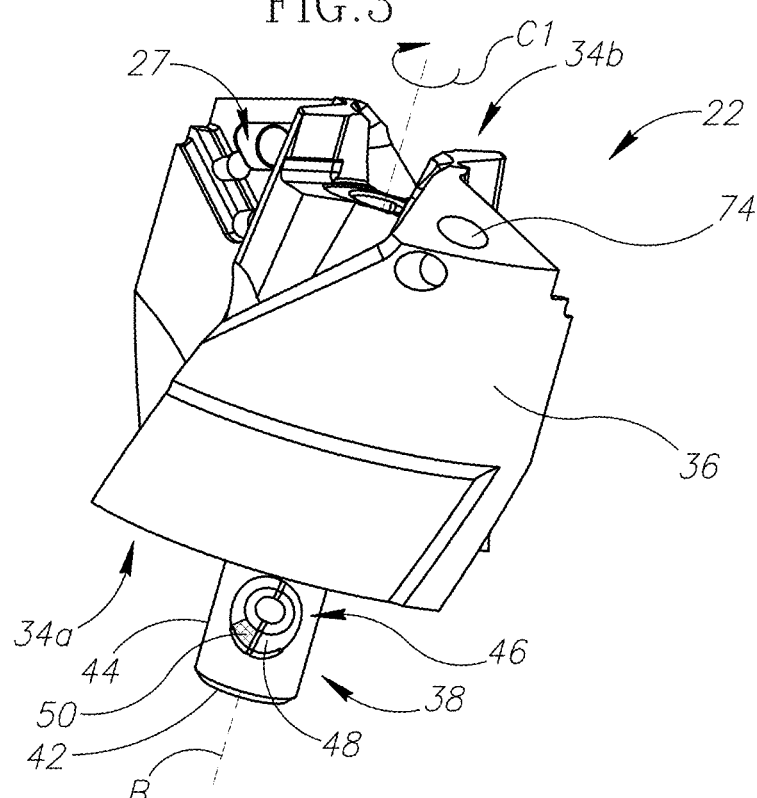
FIG. 4 is a second perspective view of the cutting head shown in FIG. 3.
Figure 5:
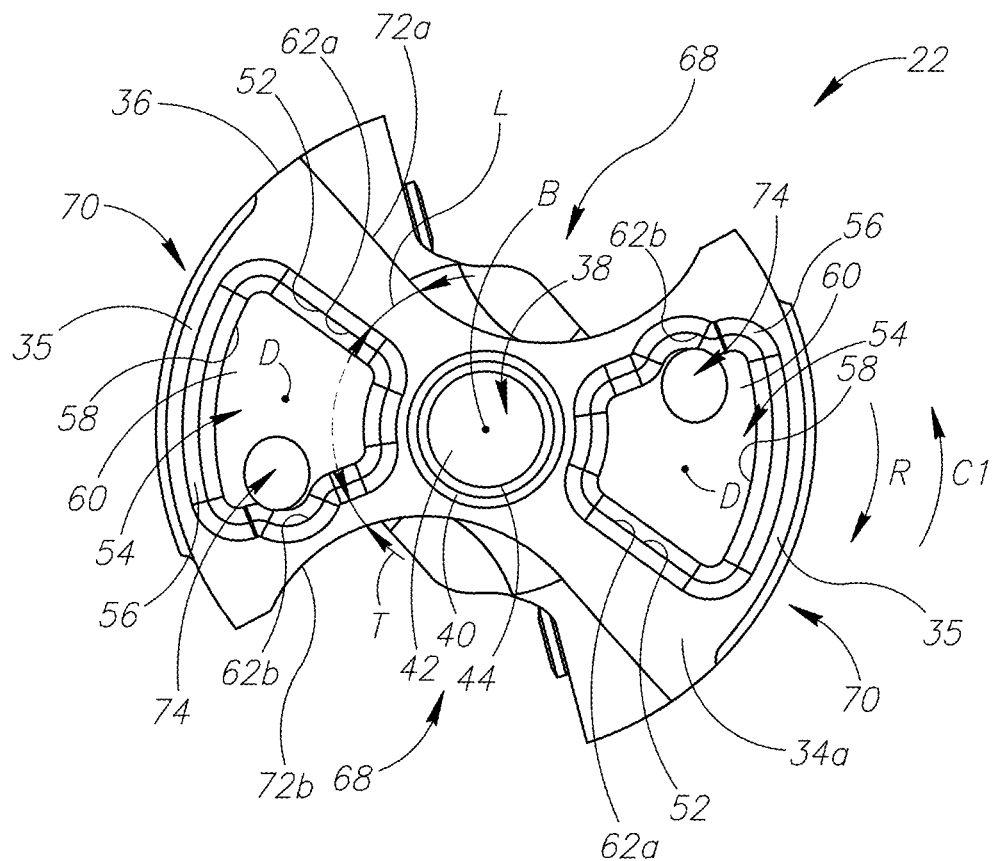
FIG. 5 is an end view of the cutting head shown in FIG. 3.

Referring to FIGS. 3 to 5, the cutting head 22, 122 includes opposite first and second head end surfaces 34a, 34b and a head peripheral surface 36 that extends therebetween. The head peripheral surface 36 extends circumferentially about the tool central axis A, and forms a boundary of the first and second head end surfaces 34a, 34b. The tool central axis A intersects the first and second head end surfaces 34a, 34b. The cutting head 22, 122 has its own head central axis B, that is co-incident with the tool central axis A when the rotary cutting tool 20, 120 is in the locked position.

Figure 6:
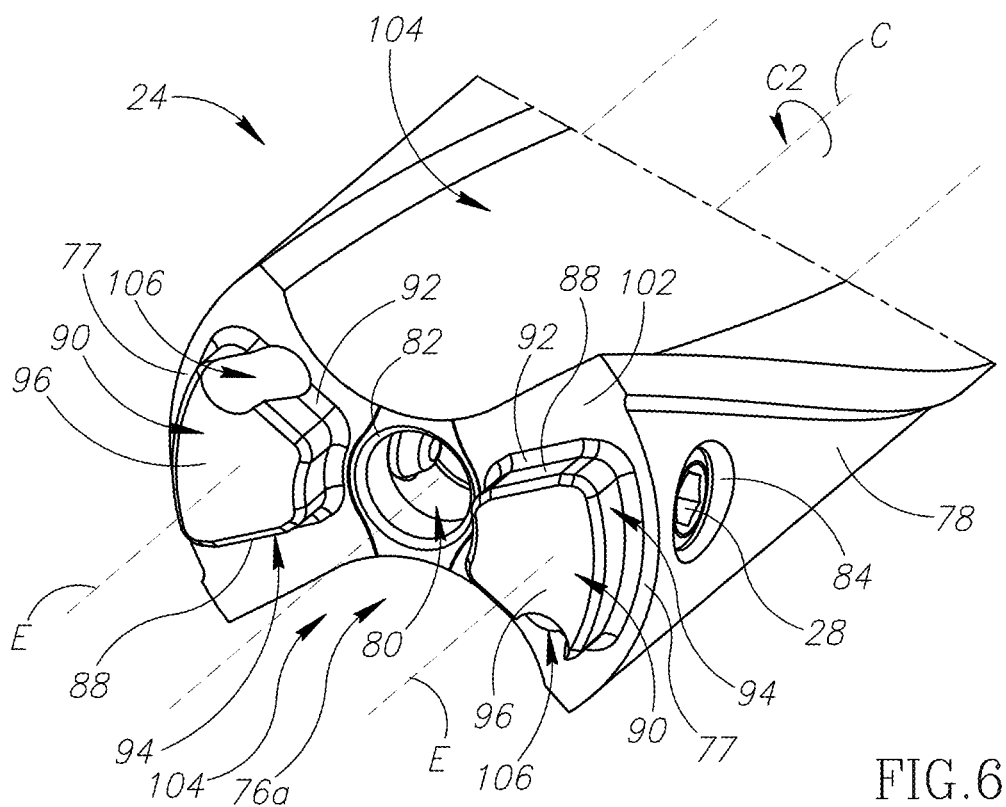
FIG. 6 is a perspective view of a tool shank shown in FIGS. 1 and 2, showing two male members.
Figure 7:
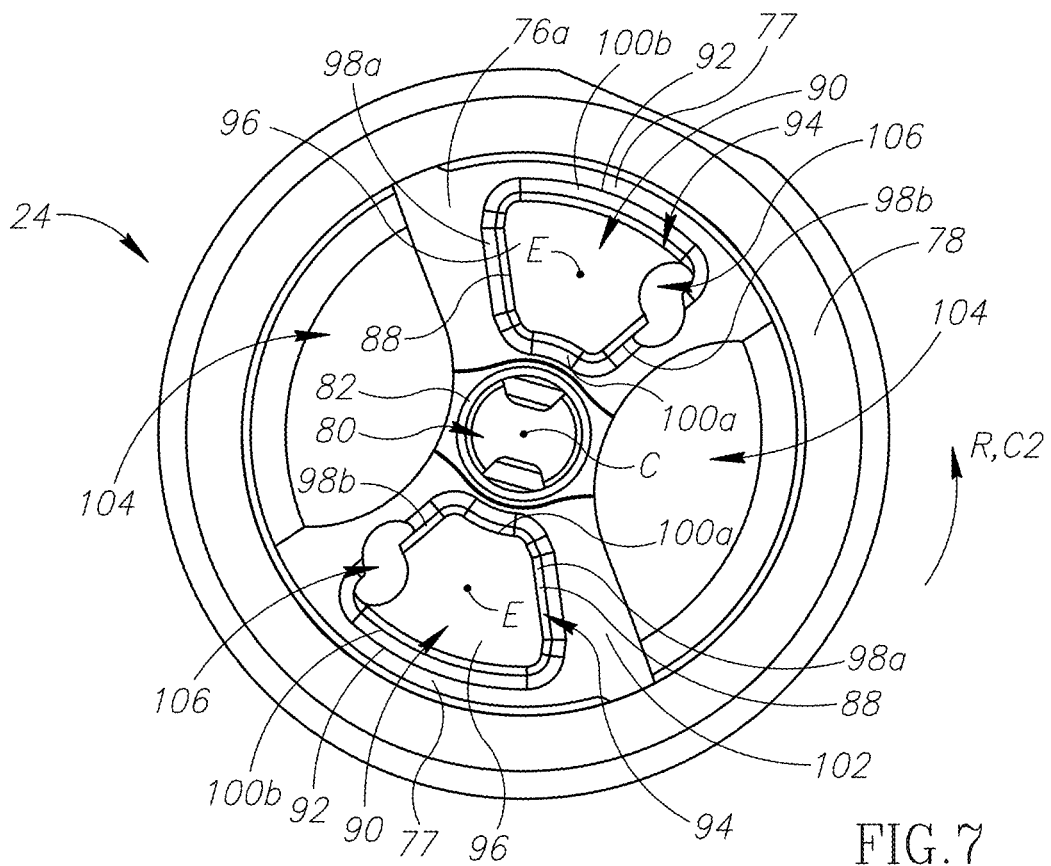
FIG. 7 is an end view of the tool shank shown in FIG. 6.

Referring to FIGS. 6 and 7, the tool shank 24, 124 includes opposite first and second shank end surfaces 76a, 76b and a shank peripheral surface 78 that extends therebetween. The shank peripheral surface 78 extends circumferentially about the tool central axis A, and forms a boundary of the first and second shank end surfaces 76a, 76b. The tool central axis A intersects the first and second shank end surfaces 76a, 76b. The tool shank 24, 124 has its own shank central axis C, that is co-incident with the tool central axis A when the rotary cutting tool 20, 120 is in the locked position.

Figure 11:
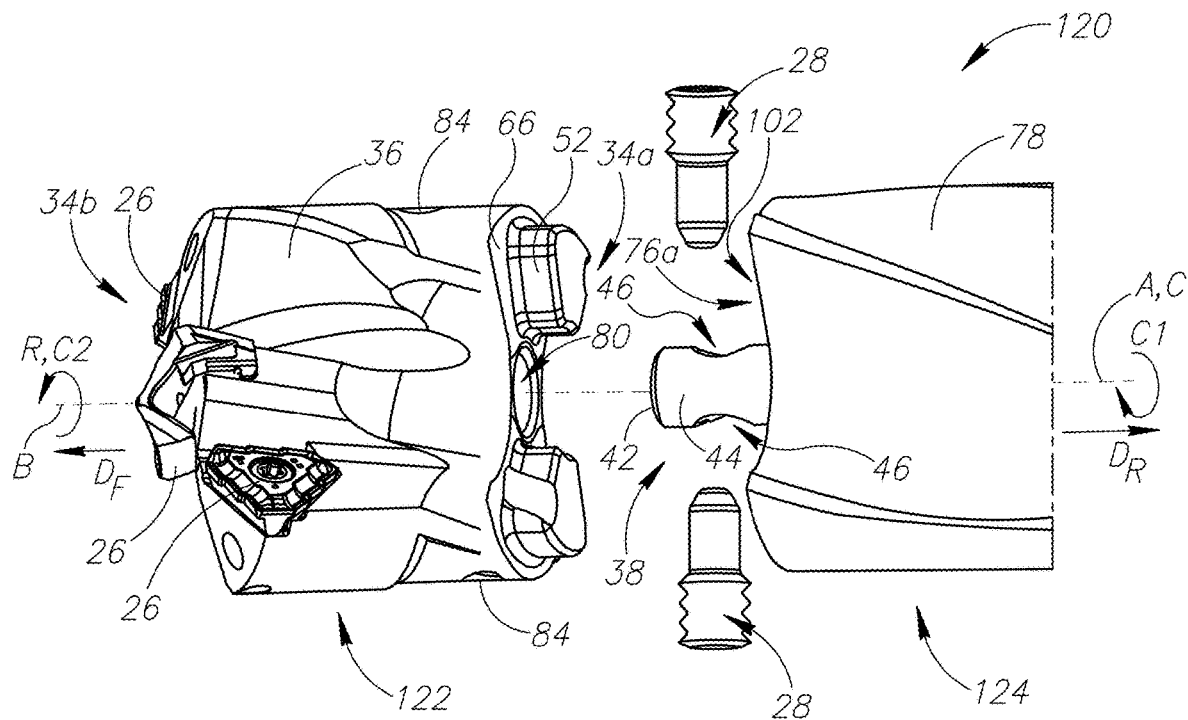
FIG. 11 is an exploded view of the rotary cutting tool in accordance with a second embodiment of the present application.

As best seen in FIGS. 3 and 11, the rotary cutting tool 20, 120 includes a locating pin 38 that projects from one of the first head end surface 34a and the first shank end surface 76a at a locating pin base surface 40. In accordance with the first embodiment of the subject matter of the present application (i.e. FIG. 3), the locating pin 38 can project from the first head end surface 34a. Alternatively, in accordance with the second embodiment of the subject matter of the present application (i.e. FIG. 11), the locating pin 38 can project from the first shank end surface 76a.

The purpose of the locating pin 38 is two-fold. Firstly, to position the cutting head 22, 122 in a precise predetermined position relative to the tool shank 24, 124. Secondly, to provide a coupling means between the cutting head 22, 122 and the tool shank 24, 124. The locating pin 38 includes a pin rear surface 42 that is spaced apart from the first head end surface 34a and a pin peripheral surface 44 that extends between the pin rear surface 42 and the first head end surface 34a. In accordance with some embodiments of the subject matter of the present application, the rotary cutting tool 20, 120 can include a single locating pin 38 that can be centrally disposed (i.e., the locating pin 38 can extend along the tool central axis A). Referring to FIG. 5, the locating pin 38 can have a cylindrical shape. Thus, the locating pin base surface 40 can be annular, i.e. ring-shaped.

As seen in FIGS. 3 and 4, the pin peripheral surface 44 includes at least one clamping recess 46. Stated differently, the at least one clamping recess 46 is peripherally disposed on the locating pin 38. The at least one clamping recess 46 is designed for receiving a portion of a respective clamping member 28. The number of clamping recesses 46 matches the number of clamping members 28. In accordance with some embodiments of the subject matter of the present application, the locating pin 38 can include exactly two clamping recess 46 that can be arranged diametrically opposite each other. Each clamping recess 46 can be spaced apart from the pin rear surface 42. Likewise, each clamping recess 46 can be spaced apart from the first head end surface 34a. Each clamping recess 46 can include a clamping recess inner peripheral surface 48 that extends from the pin peripheral surface 44. The clamping recess inner peripheral surface 48 can have a generally frusto-conical shape. Each clamping recess inner peripheral surface 48 can include a clamping recess abutment surface 50 for contact with the clamping member 28. The clamping recess abutment surface 50 can be planar.

The cutting head 22, 122 includes a plurality of head driven surfaces 52 which are circumferentially spaced apart from each other and radially inwardly spaced apart from the head peripheral surface 36. Each head driven surface 52 is arranged eccentrically with respect to the tool central axis A. Each head driven surface 52 faces generally in a first circumferential direction C1 that corresponds to a direction opposite the rotational direction R. In accordance with some embodiments of the subject matter of the present application, each head driven surface 52 can be planar and extend parallel to the tool central axis A.

As seen in FIGS. 3 and 5, in accordance with some embodiments of the subject matter of the present application, the first head end surface 34a can include a plurality of circumferentially spaced apart female members 54 recessed therein. Preferably, the first head end surface 34a can include exactly two female members 54 that can be arranged diametrically opposite each other. Each head driven surface 52 can be located in a respective one of the plurality of female members 54. Each female member 54 can open out to the first head end surface 34a at a female member opening surface 56. The female member opening surface 56 can be chamfered.

In accordance with some embodiments of the subject matter of the present application, each female member 54 can include a female member inner peripheral surface 58 that extends circumferentially about a female member axis D and that forms a boundary of a female member bottom surface 60 disposed axially opposite the female member opening surface 56. The female member axis D can be parallel to the tool central axis A. Each female member 54 can have a non-circular radial cross-section in a plane perpendicular to the female member axis D. The female member inner peripheral surface 58 can include rotationally opposite female member side surfaces 62a, 62b and radially opposite female member inner and outer surfaces 64a, 64b connecting the female member side surfaces 62a, 62b. In a view along the tool central axis A, the female member inner surface 64a can be convexly curved and the female member outer surface 64b can be concavely curved in a circumferential direction C1, C2. Thus, the female members 54 can have a basic kidney-shaped profile in an end view (i.e. FIG. 5).

Figure 8:
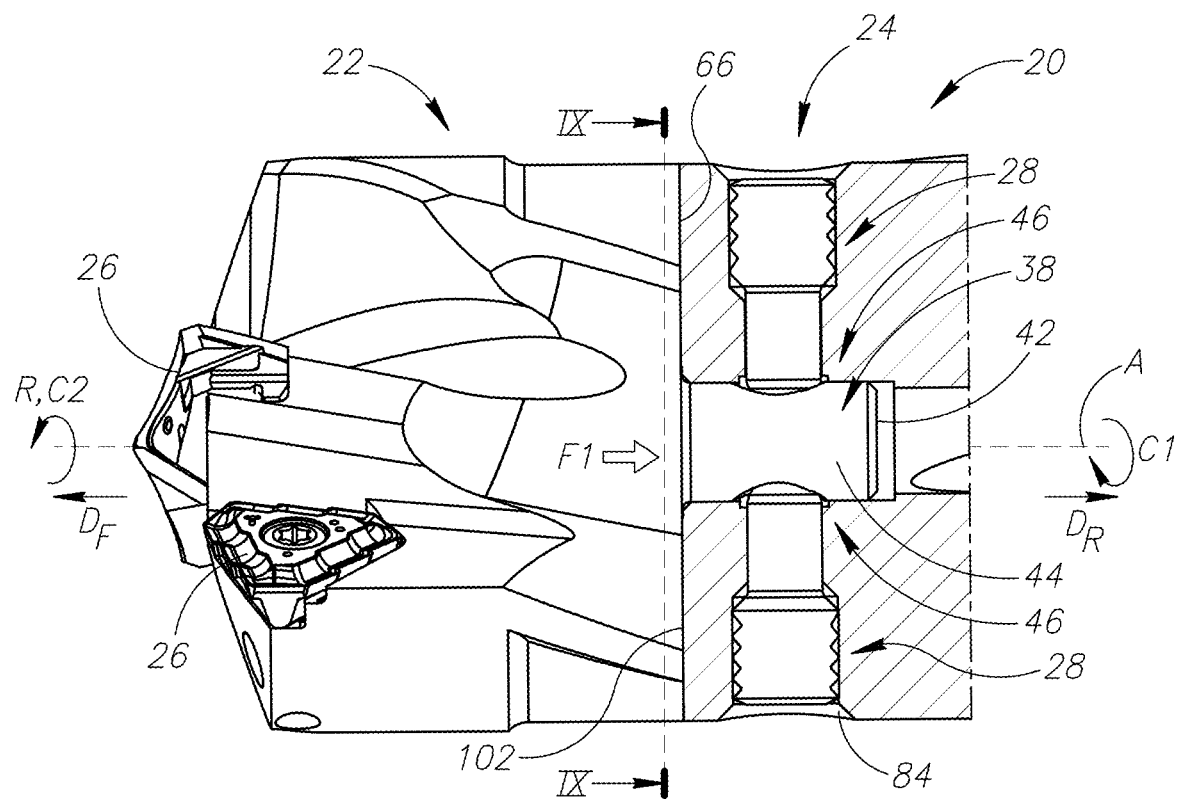
FIG. 8 is side view of the rotary cutting tool of FIG. 1, with an axial cross-section of the tool shank, taken in a plane through the clamping through bores.

As seen in FIGS. 3 and 5, the cutting head 22, 122 includes a head axial abutment surface 66 located on the first head end surface 34a. The head axial abutment surface 66 is for abutting a corresponding surface on the tool shank 24, 124. In accordance with some embodiments of the subject matter of the present application, the head axial abutment surface 66 can be disposed axially between the plurality of head driven surfaces 52 and the locating pin 38, respectively. The head axial abutment surface 66 can extend radially outwardly to the head peripheral surface 36. The locating pin base surface 40 can be completely bounded by the head axial abutment surface 66. Likewise, each female member opening surface 56 can be completely bounded by the head axial abutment surface 66. In other words, the female members 54 are radially inwardly spaced apart from the head peripheral surface 36 by a narrow head strip portion 35 of the first head end surface 34a. Thus, the plurality of female members 54 can be spaced apart from the locating pin 38 and the head peripheral surface 36. As seen in FIG. 8, showing a side view of the rotary cutting tool 20, 120, with an axial cross-section of the tool shank 24, 124 taken in a plane containing the tool central axis A and through the clamping through bores, the head axial abutment surface 66 can be planar and extend perpendicularly to the tool central axis A.

In accordance with some embodiments of the subject matter of the present application, the head peripheral surface 36 can include a plurality of head flutes 68 that extend helically about the tool central axis A. The head flutes 68 are designed for chip evacuation. The plurality of head flutes 68 can extend from the second head send surface 34b to the first head end surface 34a. However, the plurality of head flutes 68 generally do not continue onto the locating pin 38. Referring to FIG. 5, the plurality of head flutes 68 can form a plurality of cutting arms 70 that can extend radially outwardly. Each cutting arm 70 is formed between two adjacent head flutes 68 and includes rotationally opposite cutting leading and trailing surfaces 72a, 72b. Each of the cutting inserts 26 can be releasably attached at a respective one of the plurality of cutting arms 70. Likewise, each female member 54 can be located at a cutting arm 70. As see in FIG. 5, at any radial distance from the tool central axis A through the male members 90, the distance between the rotationally leading female member side surface 62a and the cutting leading surface 72a of the cutting arm 70 at which it is located defines a leading distance L and the distance between the rotationally trailing female member trailing surface 62b and the cutting trailing surface 72b of the cutting arm 70 at which it is located defines a trailing distance T, where both distances are measured in a circumferential direction C1, C2. The leading distance L can be greater than the trailing distance T.

Figure 10:
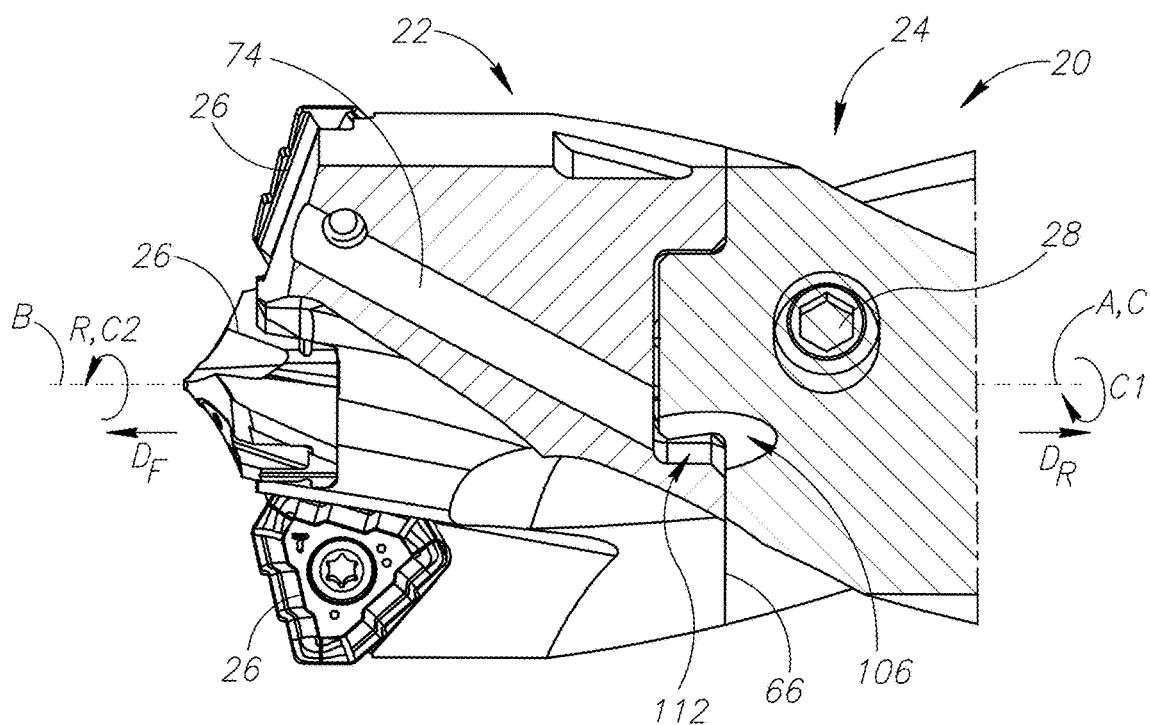
FIG. 10 is a cross-sectional view of the rotary cutting tool taken along the line X-X in FIG. 1.

Referring to FIGS. 3 and 5, in accordance with some embodiments of the subject matter of the present application, the cutting head 22, 122 can include a head coolant channel 74 that can open out a respective female member 54. Specifically, the head coolant channel 74 can open out at the female member bottom surface 60. The head coolant channel 74 can also open out at the second head end surface 34b in order to provide coolant to the cutting insert 26. Referring to FIG. 10, showing a cross-section of the rotary cutting tool 22, 122 taken in a plane parallel to the tool central axis A and through the head coolant channel 74, the head coolant channel 74 can extend linearly between the female member 54 and the second head end surface 34b. Preferably, the cutting head 22, 122 can include one head coolant channel 74 on each cutting arm 70.

As best seen in FIG. 6, the rotary cutting tool 20, 120 includes a pin receptacle 80 recessed in the other of the first head end surface 34a and the first shank end surface 76a (i.e. recessed in the first head end surface 34a or the first shank end surface 76a from which the locating pin 38 does not project). The pin receptacle 80 opens out at a pin receptacle opening surface 82. In accordance with the first embodiment of the subject matter of the present application, the pin receptacle 80 can be recessed in the first shank end surface 76a. Alternatively, in accordance with the second embodiment of the subject matter of the present application, the pin receptacle 80 can be recessed in the first head end surface 34a.

In accordance with some embodiments of the subject matter of the present application, the rotary cutting tool 20, 120 can include a single pin receptacle 80 that can be centrally disposed, i.e., the pin receptacle 80 can extend along the tool central axis A. The pin receptacle 80 can have a cylindrical shape with a diameter slightly larger than the diameter of the locating pin 38 to allow the locating pin 38 to be received into the pin receptacle 80.

Referring to FIGS. 6 and 7, the rotary cutting tool 20, 120 includes at least one clamping through bore 84 formed in whichever one of the head peripheral surface 36 and the shank peripheral surface 78 the pin receptacle 80 is recessed, so that the clamping through bore 84 opens out to the pin receptacle 80 (i.e. the at least one clamping through bore 84 is formed on the same part as the pin receptacle 80). The clamping through bore 84 is designed to receive the clamping member 28 as discussed later in the description. The number of clamping through bores 84 matches the number of clamping members 28. In accordance with some embodiments of the subject matter of the present application, the rotary cutting tool 20, 120 can include exactly two clamping through bores 84 that can be arranged diametrically opposite each other. Each clamping through bore 84 can include an internal threaded portion 86.

The tool shank 24, 124 includes a plurality of shank driving surfaces 88 which are circumferentially spaced apart from each other, and radially inwardly spaced apart from the shank peripheral surface 78. Each shank driving surface 88 is arranged eccentrically with respect to the tool central axis A. Each shank driving surface 88 faces generally in a second circumferential direction C2, opposite the first circumferential direction, and that corresponds to the rotational direction R. In accordance with some embodiments of the subject matter of the present application, each shank driving surface 88 can be planar and extend parallel to the tool central axis A.

As seen in FIG. 6, in accordance with some embodiments of the subject matter of the present application, the first shank end surface 76a can include a plurality of circumferentially spaced apart male members 90 projecting therefrom. The male members 90 are radially inwardly spaced apart from the shank peripheral surface 78 by a narrow shank strip portion 77 of the first shank end surface 76a. Thus, no surface formed of the male members 90 can be considered an axial extension of the shank peripheral surface 78. Preferably, the first shank end surface 76a can include exactly two male members 90 arranged diametrically opposite each other. Each male member 90 can be integrally formed with the tool shank 24 to have unitary one-piece construction therewith. Each shank driving surface 88 can be located on a respective one of the plurality of male members 90. Each male member 90 can project from the first shank end surface 76a at a male member base surface 92. The male member base surface 92 can have a radius.

In accordance with some embodiments of the subject matter of the present application, each male member 90 can include a male member outer peripheral surface 94 that extends circumferentially about a male member axis E and that forms a boundary of a male member top surface 96 disposed axially opposite the male member base surface 92. The male member axis E can be parallel to the tool central axis A. Each male member 90 can have a non-circular radial cross-section in a plane perpendicular to male member axis E. The male member outer peripheral surface 94 can include rotationally opposite male member side surfaces 98a, 98b and radially opposite male member inner and outer surfaces 100a, 100b connecting the male member side surfaces 98a, 98b. In a view along the tool central axis A, the male member inner surface 100a can be concavely curved and the male member outer surface 100b can be convexly curved, both in a circumferential direction C1, C2. Thus, the male members 90 can have a basic kidney-shaped profile in an end view (i.e. FIG. 7).

As seen in FIGS. 6 and 7, the tool shank 24, 124 includes a shank axial abutment surface 102 located on the first shank end surface 76a. In accordance with some embodiments of the subject matter of the present application, the shank axial abutment surface 102 can be disposed axially between the plurality of shank driving surfaces 88 and the pin receptacle 80, respectively. The shank axial abutment surface 102 can extend radially outwardly to the shank peripheral surface 78. The pin receptacle opening surface 82 can be completely bounded by the shank axial abutment surface 102. Likewise, each male member base surface 92 can be completely bounded by the shank axial abutment surface 102. Thus, the plurality of male members 90 can be radially spaced apart from the pin receptacle 80 in addition to the shank peripheral surface 78. As seen in FIG. 8, the shank axial abutment surface 102 can be planar and extend perpendicularly to the tool central axis A.

In accordance with some embodiments of the subject matter of the present application, the shank peripheral surface 78 can include a plurality of shank flutes 104 that extend helically about the tool central axis A. The plurality of shank flutes 104 can extend from the first shank end surface 76a to the second shank end surface 76b.

In accordance with some embodiments of the subject matter of the present application, the tool shank 24, 124 can include a shank coolant channel 106 that opens out at least partially at a respective male member 90. Specifically, the shank coolant channel 106 can open out at the rotationally trailing male member side surface 98b, the male member top surface 96 and the first shank end surface 76a. The shank coolant channel 106 can open out at the second shank end surface 76b, where it is fluid communication with a coolant source.

Referring to FIG. 8, in accordance with some embodiments of the subject matter of the present application, the rotary cutting tool 20, 120 can include exactly two clamping members 28. Each clamping member 28 can be rigidly formed. Each clamping member 28 can include an external threaded portion 108. Each clamping member 28 includes a clamping portion 110 that is designed to act on a respective one of the at least one clamping recesses 46. Each clamping portion 110 can have a frusto-conical shape. The clamping portion 110 and the external threaded portion 108 can be arranged at opposite ends of the clamping member 28.

In accordance with some embodiments of the subject matter of the present application, in the released position, the locating pin 38 can be located in the pin receptacle 80. The at least one clamping member 28 does not protrude into the pin receptacle 80 and thus does not act on the locating pin 38. The cutting head 22, 122 and the tool shank 24, 124 can be rotated about the tool central axis A relative to each other so that the head driven surfaces 52 do not abut the shank driving surfaces 88. Also, the cutting head 22, 122 can be moved relative to the tool shank 24, 124 in the axial direction so that so that the head axial abutment surface 66 does not abut the shank axial abutment surface 102. Thus, the cutting head 22, 122 and tool shank 24, 124 are not clamped to each other.

Assembly of the rotary cutting tool 20, 120 (i.e. adjusting the rotary cutting tool 20, 120 to the locked position) is accomplished by performing the following steps. The locating pin 38 is inserted in the pin receptacle 80 until the head axial abutment surface 66 abuts the shank axial abutment surface 102. During this step, the male members 90 can be inserted into the female members 54. Next, one of the clamping members 28 is passed through a respective one of the at least one clamping through bores 84, so that the clamping portion 110 enters the pin receptacle 80 and comes into contact with a respective one of the at least one clamping recess 46 at the clamping recess abutment surface 50.

Figure 9:
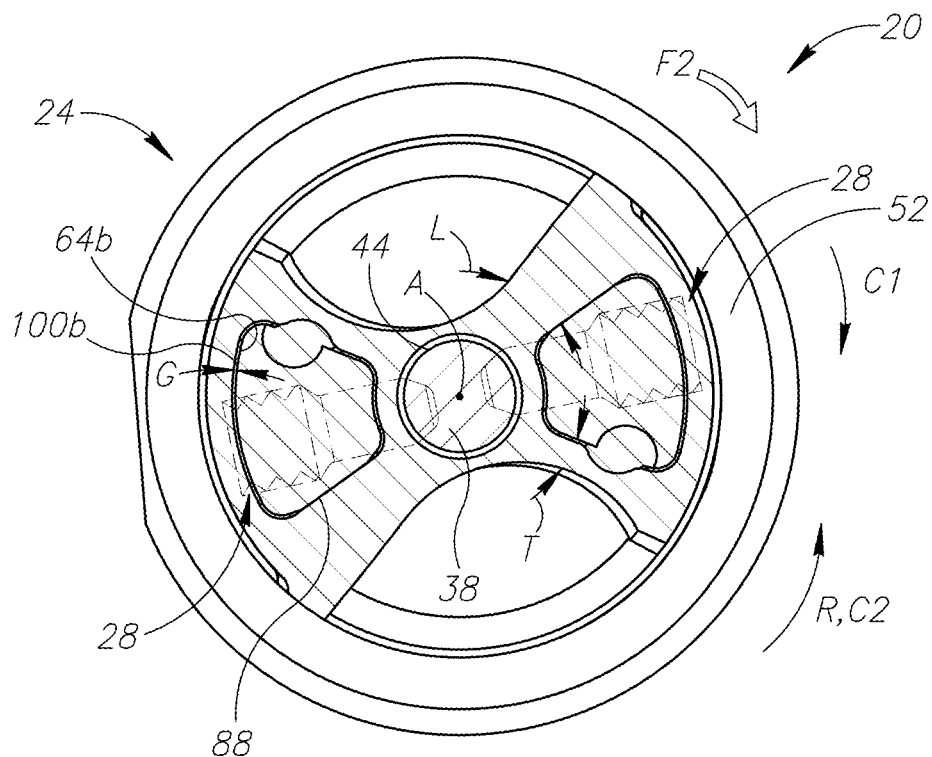
FIG. 9 is a radial cross-sectional view of the rotary cutting tool taken along the line IX-IX in FIG. 8.

Referring to FIGS. 8 and 9, due to the location and orientation and position of the clamping recess abutment surface 50, further insertion of the clamping member 28 generates first and second clamping forces F1, F2 that act simultaneously on at least one clamping recess 46 of the locating pin 38. The first clamping force F1 acts in the axial direction and urges the cutting head 22, 122 and the tool shank 24, 124 to be displaced towards each other so that the head axial abutment surface 66 firmly abuts the shank axial abutment surface 102. The second clamping force F2 acts in the circumferential direction and urges the cutting head 22, 122 to be rotated about the tool central axis A in a direction opposite the rotational direction R so that each head driven surface 52 firmly abuts a respective one of the plurality of shank driving surfaces 88. Thus, the rotary cutting tool 22, 122 is releasably clamped to the tool shank 24, 124 by at least one clamping member 28. Finally, any additional clamping members 28 are also actuated. As seen in FIG. 9, showing a radial cross-section of the rotary cutting tool 22 in the locked position, taken in a plane through the female and male members 54, 90 with the clamping member 28, locating pin 38 and pin receptacle 80 superimposed, the inner and outer surfaces 64a, 64b, 100a, 100b of the female and male members 54, 90 are not in radial abutment with each other, but rather are spaced apart from one another by a narrow gap G. Thus, the cutting head 22, 122 and tool shank 23, 124 are not releasably attached to each other via radial clamping between the female and male members 54, 90.

In accordance with some embodiments of the subject matter of the present application, in the locked position, each head flute 68 can be aligned with a respective one of the plurality of shank flutes 104. The external threaded portion 108 can be threadingly engaged with the internal threaded portion 86.

In accordance with some embodiments of the subject matter of the present application, in the locked position of the rotary cutting tool 20, 120, the head coolant channel 74 and shank coolant channel 106 can be in fluid communication with each other. As seen in FIG. 10, showing a cross-sectional view of the rotary cutting tool taken in a plane parallel to the tool central axis A and through the female and male members 54, 90, the head coolant channel 74 and shank coolant channel 106 can be in fluid communication with each other via a coolant reservoir 112 that is defined by a gap formed between the female and male members 54, 90.

It can be seen from the foregoing that in one embodiment the locating pin 38 is formed on the cutting head 22 and the pin receptacle 80 and the at least one clamping through bore 84 are formed on the tool shank 24 while in another embodiment the locating pin 38 is formed on the tool shank 124 and the pin receptacle 80 and the at least one clamping through bore 84 are formed on the cutting head 122.

It is noted that in some embodiments of the rotary cutting tool 20, the pin receptacle 80 and the plurality of male members 90 are both located on the tool shank 24. Thus, the clamping through bore 84 (also located on the tool shank 24) can be located at any desired depth since it is unimpeded by, for example, the plurality of female members 54.

It is also noted that manufacture of the part formed with the locating pin 38 and the plurality of female members 54 is easier and cheaper than manufacture of the part formed with the pin receptacle 80 and the plurality of male members 90. It is therefore preferable to have the cutting head 22 formed with the locating pin 38 and the plurality of female members 54 (i.e. the first of the abovementioned configurations) since replacement of the cutting head 22, 122, due to damage etc., occurs significantly more frequently than replacement of the tool shank 24, 124.

It is further noted that the cutting head 122 formed with the pin receptacle 80 and the plurality of male members 90 (i.e. the second embodiment) has a minimum length defined by the length of the pin receptacle 80.

It is yet further noted that, advantageously, the portions of the cutting head 22 rotationally forward, and axially level, with the head driven surfaces 52 are more rigid and less prone to bend or break when the plurality of female members 54 are radially inwardly spaced apart from, and do not open out to, the head peripheral surface 36.

The rotary cutting tool 20, 120 described above has been shown to be particularly effective at drilling holes having a depth in a range of between 350-400 mm with minimal runout, while maintaining a stable coupling between the cutting head 22, 122 and the tool shank 24, 124.

Although the subject matter of the present application has been described to a certain degree of particularity, it should be understood that various alterations and modifications could be made without departing from the spirit or scope of the invention as hereinafter claimed. For example, the tool shank 24, 124 can be formed of multiple parts coupled together via a coupling mechanism of the type described above.

What is claimed is:

1. A rotary cutting tool (20,120), having a tool central axis (A) that defines opposite forward and rearward directions ($D_F$, $D_R$) and about which the rotary cutting tool (20,120) is rotatable in a rotational direction (R), the rotary cutting tool (20,120) including:
   a cutting head (22, 122) comprising:
      a head peripheral surface (36) extending circumferentially about the tool central axis (A) and forming a boundary of a rearwardly facing first head end surface (34a), the first head end surface (34a) comprising a plurality of female members (54) recessed therein;
      a head axial abutment surface (66) located on the first head end surface (34a);

a plurality of head driven surfaces (52) circumferentially spaced apart from each other and radially inwardly spaced apart from the head peripheral surface (36), the head driven surfaces (52) facing generally in a first circumferential direction (C1) which is opposite to the rotational direction (R), each head driven surface (52) located in a respective one of the plurality of female members (54); and at least one cutting insert (26) releasably attached to the cutting head (22, 122);

a tool shank (24, 124) comprising:

a shank peripheral surface (78) extending circumferentially about the tool central axis (A) and forming a boundary of a forwardly facing first shank end surface (76*a*), the first shank end surface (76*a*) comprising a plurality of male members (90) projecting therefrom, each male member (90) being integrally formed with the tool shank (24) to have unitary one-piece construction therewith;

a shank axial abutment surface (102) located on the first shank end surface (76*a*); and a plurality of shank driving surfaces (88) circumferentially spaced apart from each other and radially inwardly spaced apart from the shank peripheral surface (78), the shank driving surfaces (88) facing generally in a second circumferential direction (C2) which is opposite the first circumferential direction (C1), each shank driving surface (88) being located on a respective one of the plurality of male members (90**);

a locating pin (38) projecting from one of the first head end surface (34*a*) and the first shank end surface (76*a*), the locating pin (38) having at least one peripherally disposed clamping recess (46);

a pin receptacle (80) recessed in the other of the first head end surface (34*a*) and the first shank end surface (76*a*); and at least one clamping through bore (84) formed in whichever one of the head peripheral surface (36) and the shank peripheral surface (78) the pin receptacle (80) is recessed, so that the clamping through bore (84) opens out to the pin receptacle (80), wherein:

the rotary cutting tool (20, 120) is adjustable between a released position and a locked position, and in the locked position:

the locating pin (38) is received into the pin receptacle (80); and at least one clamping member (28) passes through the at least one clamping through bore (84) and acts on the at least one clamping recess (46) of the locating pin (38), so that:

each shank driving surface (88) abuts a corresponding one of the head driven surfaces (52);

the head axial abutment surface (66) abuts the shank axial abutment surface (102); and the cutting head (22, 122) and tool shank (24, 124) are releasably clamped together.

2. The rotary cutting tool (20), according to claim 1, wherein:

the locating pin (38) projects from the first head end surface (34*a***);

the pin receptacle (80) is recessed in the first shank end surface (76*a*); and the at least one clamping through bore (84) is formed in the shank peripheral surface (78**).

3. The rotary cutting tool (20), according to claim 2, wherein:

the head axial abutment surface (66) is disposed axially between the plurality of head driven surfaces (52) and the locating pin (38), respectively; and the shank axial abutment surface (102) is disposed axially between the plurality of shank driving surfaces (88) and the pin receptacle (80), respectively.

4. The rotary cutting tool (20), according to claim 2, wherein:

the plurality of female members (54) are circumferentially spaced apart from each other and radially inwardly spaced apart from the head peripheral surface (36) by a narrow head strip portion (35) of the first head end surface (34*a***);

the plurality of male members (90) are circumferentially spaced apart from each other and radially inwardly spaced apart from the shank peripheral surface (78) by a narrow shank strip portion (77) of the first shank end surface (76*a***).

5. The rotary cutting tool (20), according to claim 4, wherein:

the cutting head (22) comprises a head coolant channel (74) that opens out at a respective female member (54);

the tool shank (24) comprises a shank coolant channel (106) that opens out at least partially at a respective male member (90); and the head coolant channel (74) and shank coolant channel (106) are in fluid communication with each other.

6. The rotary cutting tool (20), according to claim 5, wherein:

the head coolant channel (74) and shank coolant channel (106) are in fluid communication with each other via a coolant reservoir (112) defined by a gap formed between the female and male members (54, 90).

7. The rotary cutting tool (20), according to claim 4, wherein the female and male members (54, 90) are not in radial abutment with each other, in the locked position.

8. The rotary cutting tool (20), according to claim 4, wherein:

the first head end surface (34*a*) comprises exactly two female members (54) arranged diametrically opposite each other; and the first shank end surface (76*a*) comprises exactly two male members (90) arranged diametrically opposite each other.

9. The rotary cutting tool (20), according to claim 4, wherein:

each female member (54) has a non-circular radial cross-section; and each male member (90) has a non-circular radial cross-section.

10. The rotary cutting tool (20), according to claim 4, wherein each female member (54) opens out to the first head end surface (34*a*) at a female member opening surface (56) which is completely bounded by the head axial abutment surface (66**).

11. The rotary cutting tool (20), according to claim 4, wherein:

each female member (54) comprises a female member inner peripheral surface (58) extending circumferentially about a female member axis (D) and forming a boundary of a female member bottom surface (60); and the cutting head (22) comprises a head coolant channel (74) that opens out at the female member bottom surface (60).

12. The rotary cutting tool (20), according to claim 11, wherein:

the head peripheral surface (36) comprises a plurality of head flutes (68) that extend helically about the tool central axis (A) to the first head end surface (34a), forming a plurality of cutting arms (70), each cutting arm (70) being formed between two adjacent head flutes (68) and comprising rotationally opposite cutting leading and trailing surfaces (72a, 72b);

each female member (54) is located at a cutting arm (70);

the female member inner peripheral surface (58) comprises rotationally opposite female member side surfaces (62a, 62b) and radially opposite female member inner and outer surfaces (64a, 64b) connecting the female member side surfaces (62a, 62b);

at any radial distance from the tool central axis (A) through the male members (90), the distance between the rotationally leading female member side surface (62a) and the cutting leading surface (72a) of the cutting arm (70) at which it is located defines a leading distance (L) and the distance between the rotationally trailing female member side surface (62b) and the cutting trailing surface (72h) of the cutting arm (70) at which it is located defines a trailing distance (T), both distances are measured in a circumferential direction (C1, C2); and the leading distance (L) is greater than the trailing distance (T).

13. The rotary cutting tool (20), according to claim 4, wherein each male member (90) projects from the first shank end surface (76a) at a male member base surface (92) which is completely bounded by the shank axial abutment surface (102).

14. The rotary cutting tool (20), according to claim 4, wherein:
each male member (90) comprises a male member outer peripheral surface (94) extending circumferentially about a male member axis (E) and forming a boundary of a male member top surface (96), the male member outer peripheral surface (94) comprising:
rotationally opposite male member side surfaces (98a, 98b); and
radially opposite male member inner and outer surfaces (100a, 100b) connecting the male member side surfaces (98a, 98b); and
the tool shank (24) comprises a shank coolant channel (106) that opens out at the rotationally trailing male member side surface (98b), the male member top surface (96) and the first shank end surface (76a).

15. The rotary cutting tool (20,120), according to claim 1, wherein:
the head peripheral surface (36) comprises a plurality of head flutes (68) that extend helically about the tool central axis (A) to the first head end surface (34a).

16. The rotary cutting tool (20), according to claim 15, wherein:
the locating pin (38) projects from the first head end surface (34a); and
the plurality of head flutes (68) do not continue onto the locating pin (38).

17. The rotary cutting tool (20,120), according to claim 15, wherein:
the shank peripheral surface (78) comprises a plurality of shank flutes (104) that extend helically about the tool central axis (A) to the first shank end surface (76a); and
in the locked position, each head flute (68) is aligned with a respective one of the plurality of shank flutes (104).

18. The rotary cutting tool (20, 120), according to claim 1, wherein:

the rotary cutting tool (20, 120) comprises a single centrally disposed locating pin (38) and a single centrally disposed pin receptacle (80).

19. The rotary cutting tool (20,120), according to claim 1, wherein the head and shank axial abutment surfaces (66, 102) extend to the head and shank peripheral surfaces (36, 78), respectively.

20. The rotary cutting tool (20,120), according to claim 1, wherein the head and shank axial abutment surfaces (66, 102) are planar, and extend perpendicularly to the tool central axis (A).

21. The rotary cutting tool (20,120), according to claim 1, wherein each head driven surface (52) and each shank driving surface (88) is planar, and extends parallel to the tool central axis (A).

22. The rotary cutting tool (20,120), according to claim 1, wherein:
the rotary cutting tool (20,120) comprises exactly two clamping members (28) and exactly two clamping through bores (84); and
the locating pin (38) comprises exactly two clamping recesses (46).

23. The rotary cutting tool (20,120), according to claim 1, wherein each clamping recess (46) comprises a clamping recess inner peripheral surface (48) that has a generally frusto-conical shape.

24. The rotary cutting tool (20,120), according to claim 1, wherein each clamping member (28) is rigidly formed.

25. The rotary cutting tool (20,120), according to claim 1, wherein:
each clamping through bore (84) comprises an internal threaded portion (86);
each clamping member (28) comprises an external threaded portion (108); and
in the locked position, the external threaded portion (108) is threadingly engaged with the internal threaded portion (86).

26. The rotary cutting tool (20,120), according to claim 1, wherein each clamping member (28) comprises a clamping portion (110) that acts on a respective one of the at least one clamping recesses (46), the clamping portion (110) having a frusto-conical shape.

27. The rotary cutting tool (20,120), according to claim 1, wherein the cutting head (22, 122) and the tool shank (24, 124) have the same hardness.

28. The rotary cutting tool (120), according to claim 1, wherein:
the locating pin (38) projects from the first shank end surface (76a);
the pin receptacle (80) is recessed in the first head end surface (34a); and
the at least one clamping through bore (84) is formed in the head peripheral surface (36).

29. A cutting head (22, 122), having a head central axis (B) that defines opposite forward and rearward directions ($D_F$, $D_R$) and about which the cutting head (22,122) is rotatable in a rotational direction (R), the cutting head (22, 122) comprising:
a head peripheral surface (36) extending circumferentially about the head central axis (B) and forming a boundary of a rearwardly facing first head end surface (34a), the first head end surface (34a) comprising a plurality of female members (54) recessed therein, each female member (54) having a non-circular radial cross-section;
a head axial abutment surface (66) located on the head end surface (34a);

a plurality of head driven surfaces (52) circumferentially spaced apart from each other and radially inwardly spaced apart from the head peripheral surface (36), the head driven surfaces (52) facing generally in a first circumferential direction (C1) which is opposite to the rotational direction (It), each head driven surface (52) located in a respective one of the plurality of female members (54);

at least one cutting insert (26) releasably attached to the cutting head (22, 122); and either:
 a locating pin (38) projecting from the first head end surface (34a), the locating pin (38) having at least one peripherally disposed clamping recess (46); or
 a pin receptacle (80) recessed in the first head end surface (34a) and at least one clamping through bore (84) formed in the head peripheral surface (36) and opening out to the pin receptacle (80).

30. The cutting head (22,122), according to claim 29, wherein the head peripheral surface (36) comprises a plurality of head flutes (68) that extend helically about the head central axis (B) to the first head end surface (34a).

31. The cutting head (22), according to claim 30, wherein:
the locating pin (38) projects from the first head end surface (34a); and
the plurality of head flutes (68) do not continue onto the locating pin (38).

32. The cutting head (22), according to claim 29, wherein:
the locating pin (38) projects from the first head end surface (34a).

33. The cutting head (22), according to claim 32, wherein:
the female members (54) are circumferentially spaced apart from each other and radially inwardly spaced apart from the head peripheral surface (36) by a narrow head strip portion (35) of the first head end surface (34a).

34. The cutting head (22, 122), according to claim 32, wherein the locating pin (38) comprises exactly two clamping recesses (46).

35. The cutting head (22, 122), according to claim 32, wherein each clamping recess (46) comprises a clamping recess inner peripheral surface (48) that has a generally frusta-conical shape.

36. The cutting head (22, 122) according to claim 29, comprising, either:
a single centrally disposed locating pin (38), or a single centrally disposed pin receptacle (80).

37. A cutting head (22, 122), having a head central axis (B) that defines opposite forward and rearward directions ($D_F$, $D_R$) and about which the cutting head (22,122) is rotatable in a rotational direction (R), the cutting head (22, 122) comprising:
a head peripheral surface (36) extending circumferentially about the head central axis (B) and forming a boundary of a rearwardly facing first head end surface (34a);
a head axial abutment surface (66) located on the head end surface (34a); and
a plurality of head driven surfaces (52) circumferentially spaced apart from each other and radially inwardly spaced apart from the head peripheral surface (36), the head driven surfaces (52) facing generally in a first circumferential direction (C1) which is opposite to the rotational direction (R);
wherein the cutting head (22, 122) has either:
 a centrally disposed locating pin (38) projecting from the first head end surface (34a), the locating pin (38) having at least one peripherally disposed clamping recess (46); or
 a centrally disposed pin receptacle (80) recessed in the first head end surface (34a) and at least one clamping through bore (84) formed in the head peripheral surface (36) and opening out to the pin receptacle (80); and
wherein the first head end surface (34a) comprises either:
 a plurality of female members (54) recessed therein, each female member (54) having a non-circular radial cross-section, with each head driven surface (52) located in a respective one of the plurality of female members (54); or
 a plurality of male members (90) projecting therefrom, each male member (90) having a non-circular radial cross-section, with each head driven surface (52) located on a respective one of the plurality of male members (90).

38. The cutting head (22) according to claim 37, comprising:
said centrally disposed locating pin (38); and
said plurality of female members (54).

39. The cutting head (122) according to claim 37, comprising:
said centrally disposed pin receptacle (80); and
said plurality of male members (90).

40. A tool shank head (24, 124), having a shank central axis (C) that defines opposite forward and rearward directions ($D_F$, $D_R$) and about which the cutting head (22,122) is rotatable in a rotational direction (R), the tool shank (24, 124) comprising:
a shank peripheral surface (78) extending circumferentially about the tool central axis (A) and forming a boundary of a forwardly facing first shank end surface (76a);
a shank axial abutment surface 102) located on the first shank end surface (76a); and
a plurality of shank driving surfaces (88) circumferentially spaced apart from each other and radially inwardly spaced apart from the shank peripheral surface (78), the shank driving surfaces (88) facing generally in the rotational direction (R);
wherein the tool shank (24, 124) has either:
 a centrally disposed locating pin (38) projecting from the first shank end surface (76a), the locating pin (38) having at least one peripherally disposed clamping recess (46); or
 a centrally disposed pin receptacle (80) recessed in the first shank end surface (76a) and at least one clamping through bore (84) formed in the head peripheral surface (36) and opening out to the pin receptacle (80); and
wherein the first shank end surface (76a) comprises either:
 a plurality of female members (54) recessed therein, each female member (54) having a non-circular radial cross-section, with each shank driving surface (88) located in a respective one of the plurality of female members (54); or
 a plurality of male members (90) projecting therefrom, each male member (90) having a non-circular radial cross-section, with each shank driving surface (88) located on a respective one of the plurality of male members (90).

41. The tool shank head (24) according to claim 40, comprising:
- said centrally disposed locating pin (38); and
- said plurality of female members (54).

42. The tool shank (124) according to claim 40, comprising:
- said centrally disposed pin receptacle (80); and
- said plurality of male members (90).

* * * * *